US010643491B2

(12) United States Patent
Chelel

(10) Patent No.: US 10,643,491 B2
(45) Date of Patent: May 5, 2020

(54) PROCESS, SYSTEM AND METHOD FOR STEP-BY-STEP PAINTING OF AN IMAGE ON A TRANSPARENT SURFACE

(71) Applicant: Matthew Chelel, Rockaway Township, NJ (US)

(72) Inventor: Matthew Chelel, Rockaway Township, NJ (US)

( * ) Notice: Subject to any disclaimer, the term of this patent is extended or adjusted under 35 U.S.C. 154(b) by 203 days.

(21) Appl. No.: 15/458,480

(22) Filed: Mar. 14, 2017

(65) Prior Publication Data

US 2018/0268730 A1  Sep. 20, 2018

(51) Int. Cl.
*G09B 11/04* (2006.01)
*G09B 11/06* (2006.01)
*G09B 11/10* (2006.01)
*G06F 3/0481* (2013.01)

(52) U.S. Cl.
CPC ............ *G09B 11/04* (2013.01); *G06F 3/0481* (2013.01); *G09B 11/06* (2013.01); *G09B 11/10* (2013.01)

(58) Field of Classification Search
CPC ......... G09B 11/04; G09B 11/10; G09B 11/06; G06F 3/048
USPC .......................................................... 434/84
See application file for complete search history.

(56) References Cited

U.S. PATENT DOCUMENTS

| | | | |
|---|---|---|---|
| 3,846,826 A | 11/1974 | Mueller | |
| 5,382,233 A * | 1/1995 | Brotz | G09B 5/08 434/81 |
| 5,835,086 A | 11/1998 | Bradstreet et al. | |
| 5,977,982 A | 11/1999 | Lauzon | |
| 6,021,417 A | 2/2000 | Massarksy | |
| 6,168,438 B1 * | 1/2001 | Leonard | G09B 11/06 434/81 |
| 6,870,550 B1 | 3/2005 | Schuster et al. | |
| 6,919,893 B2 | 7/2005 | Tobita et al. | |
| 7,205,995 B1 * | 4/2007 | Hod | G09B 11/10 345/581 |
| 8,830,212 B2 | 9/2014 | Vaganov | |
| 8,896,579 B2 | 11/2014 | DiVerdi | |
| 2002/0118209 A1 | 8/2002 | Hylen | |
| 2015/0125829 A1 * | 5/2015 | Hyman | B44C 3/046 434/81 |

* cited by examiner

*Primary Examiner* — Robert P Bullington
(74) *Attorney, Agent, or Firm* — Gearhart Law, LLC

(57) ABSTRACT

A system and method for producing painted pictures is provided. The system includes a painting kit, including at least one utensil suitable for applying paint and a plurality of paints, one or more transparent sheets onto which the plurality of paints can adhere, a display device configured to display one or more of a series of images, a processor configured to store the series of images, and an adhesive configured to secure one or more of the one or more transparent sheets over the display device.

13 Claims, 23 Drawing Sheets

100

```
┌─────────────────────────────────┐
│     OPENING APPLICATION         │
│             105                 │
└─────────────────────────────────┘
              │
              ▼
┌─────────────────────────────────┐
│       SELECT CATEGORY           │
│             110                 │
└─────────────────────────────────┘
              │
              ▼
┌─────────────────────────────────┐
│       SELECT PAINTING           │
│             115                 │
└─────────────────────────────────┘
              │
              ▼
┌─────────────────────────────────┐
│         UPLOAD IMAGE            │
│             120                 │
└─────────────────────────────────┘
              │
              ▼
┌─────────────────────────────────┐
│ CONVERT IMAGE TO BLACK-AND-WHITE│
│           TEMPLATE              │
│             125                 │
└─────────────────────────────────┘
              │
              ▼
```

FIG. 1A

PROCESS, SYSTEM AND METHOD FOR STEP-BY-STEP PAINTING OF AN IMAGE ON A TRANSPARENT SURFACE

CLAIM OF PRIORITY

This application is a United States non-provisional application and claims no priority to any previous patent or patent application.

FIELD OF THE EMBODIMENTS

The field of the embodiments of the present invention relates systems and methods for painting pictures and, in particular, processes, systems, and methods for guiding one or more users through the painting of a picture using a video monitor.

BACKGROUND OF THE EMBODIMENTS

Painting has been an art form for millennia. For many years, there have been lessons on how to paint and pre-drawn outlines on paper or canvas, over which a person is instructed to paint. However, with the development lightweight transparent materials, such as plastic, and the advent of flat-screen video monitors, there has yet to be a method presented incorporating these technologies in the teaching and guiding of users to complete painted imagery.

Throughout the history of fine art, technology has always played a role. For example the invention of the camera forced painters to find new ways to create, and gave their art new purpose. Since cameras could more readily reproduce images better, cheaper, and with more accurate detail than painters, artists explored new ways to create their art. By doing so, paintings became more expressive, more colorful, and looser to the point of abstraction. It is a natural progression for technology (i.e.: photography/graphic design) to eventually aide in the production of new methods of painting. The world has gone through a technology revolution, and now a revolution of the arts, bringing us full circle to art through technology. In today's world, people are taking photos via cell phone at an amazing rate. At the same time, growing technologies in the fields of networking and graphic design software enable people and businesses to disseminate not just photos but graphical images (photos that have been filtered) to people throughout the world. This has set the stage for a movement, a revolution in the world of painting in which all can be empowered. By fusing technology with art to provide structure with the expressive world of abstract painting, a new art making process has been born.

Examples of related art are described below:

U.S. Pat. No. 3,846,826 pertains to a system and method that enables a person to paint or draw directly into color television. No special probe or stylus is required since a person can use brushes or pens, fingertips, rubber stamps, or any drawing or painting object whatsoever. At the same time, a person can place his free hand over a piano-like keyboard to synthesize images by manipulating or altering the images or forms as they are introduced. It is applicable to graphic productions of all sorts, computer input-output graphic processing systems, for visualizing mathematical transformations, or for use with scanning lasers or electron microscopes that etch or score.

U.S. Pat. No. 5,835,086 pertains to a method and apparatus for painting a digital picture using strokes of a digital brush. The painting strokes entered by a user is handled using a "lazy" processing approach, in which a region of the picture being painted is updated according to the entered strokes only when that region is to be displayed for viewing. To this end, the painting strokes are recorded as an ordered sequence of painting steps. The digital picture being painted is partitioned into a plurality of individual regions, and each region is assigned an age which indicates a painting step in the ordered sequence that is last applied to that region. When a region becomes visible, i.e., it is displayed for viewing, the age of the region is checked, and all of the painting steps in the ordered sequence that are after the step indicated by the age of the region are then applied to the region so that it becomes up-to-date. The age of that region is updated accordingly.

U.S. Pat. No. 5,977,982 pertains to a system and method for modification of the visual characteristics of digital 3D objects includes a shading buffer wherein parameters relating to the visual characteristics of a rendered 3D object are stored. When a texture applied to the 3D object is selected for modification, a pre-rendering step is performed and a shading buffer constructed. The shading buffer includes pre-computed components of the visual characteristic information for each rendered pixel of the displayed 3D object, these components are independent of the texture selected for modification. When the texture is modified, by indicating one or more pixels on the 3D object to which the texture is applied, re-rendering of those pixels is accomplished by evaluating a simple combination of the corresponding pre-computed components in the shading buffer and the modification effected to the selected texture to obtain new final values to render the pixels. By pre-computing and arranging the components in the shading buffer, the computational requirements for re-rendering the modified portions of the 3D object are reduced, allowing real time re-rendering in many circumstances.

U.S. Pat. No. 6,021,417 pertains to a method of simulating the creation of a mock artist's drawing or painting image on a monitor, from an electronically-stored image, comprising translating the electronically-stored image into instructions capable of creating the mock image; generating and displaying on the monitor an icon which simulates drawing or painting the mock image; and using the instructions to move the icon across the monitor, wherein the mock image is created gradually as the icon moves across the monitor, to simulate the process by which an artist may create the mock image. Also disclosed is a device for accomplishing the methods of this invention.

U.S. Pat. No. 6,870,550 pertains to a method in which a user identifies an area of a digital canvas. Color gradients are determined based on a corresponding area on a reference. Brush strokes are applied in the area of the digital canvas, the brush strokes having trajectories based on the color gradients.

U.S. Pat. No. 6,919,893 pertains to an image editing apparatus that includes a mouse and a display function as a drawing interface, such as a digital canvas, a palette, and a pen or a brush. A stroke input by a user by dragging the mouse is regarded as a hand-drawn operation with the pen or the brush. In the digital canvas, painting is performed by using inks having various attributes and activities such as texture and animation, based on the stroke input by the user.

U.S. Pat. No. 8,830,212 pertains to a method and system for recording hand-painted, hand-drawn and handwritten information defined by a hand and/or fingers movement. The system corresponding to the invented method comprises: a computing device with a display, an input device comprising: an end-point coupled to a force sensor, additional motion sensors, IC circuit for digitizing the information from sensors and processing the data related to the force and motion vectors components; hardware and software for providing a digital description of how the device has been pressed to the surface and how the device has been moved. Besides above mentioned applications the method and system can also be used for precise cursor navigation on the display, computer gaming and as a universal remote control for electronic equipment and appliances or as a security device with multi-level authentication. With an addition of several components the input device can be used as a smart cell-phone.

U.S. Pat. No. 8,896,579 pertains to a graphics application for simulating natural media drawing and painting may model a tablet stylus as if it were a virtual projector, and as if a 2D brush tip image were projected on a virtual canvas. The application may compute a texture projection based on the values of configurable parameters of the application and/or 6DOF data collected from the tablet stylus and/or the tablet. This texture projection (i.e., the mark resulting from deformation of the 2D brush tip image due to the stylus pose) may be used as a 2D stamp to create a mark on the virtual canvas in response to contact between the stylus and tablet. This may create a more natural mapping between tablet stylus poses and the resulting marks for artists accustomed to the behavior of pencils, felt tip pens, airbrushes, or another natural media, compared to those employed in previous digital painting applications.

U.S. Patent Application No. 2002/0118209 pertains to a method for applying "painting" effects to a digitized image. A first method includes the step of creating a bitmap from an inputted digitized image wherein color values are assigned to each pixel in the image. The method then compares the color values of each pixel in the bitmap and determines "pixel-commonality" which defines "working regions". The method then applies a predetermined texture to each working region from a database of textures. The particular texture selected is dependent on the particular artist or painting style chosen by the user. After the method displays the altered image (the image having the applied textures), the user may decide whether to save the altered image, or to have the method "re-paint" the original image. The method can "re-paint" the image by automatically changing predetermined parameters or default settings used to define working regions and/or the type and intensity of the applied textures.

It is noted that none of the art described above addresses all of the issues addressed by the embodiments of the present invention.

SUMMARY OF THE EMBODIMENTS

According to an embodiment of the present invention, a system for producing painted pictures is provided. The system includes a painting kit, including at least one utensil suitable for applying paint and a plurality of paints, one or more transparent sheets onto which the plurality of paints can adhere, a display device configured to display one or more of a series of images, a processor configured to store the series of images, and an adhesive configured to secure one or more of the one or more transparent sheets over the display device.

According to another embodiment of the present invention, a method is provided for producing painted pictures. The method includes selecting, using a graphical user interface coupled to a display device, a design for a painting from a series of designs, wherein each design in the series of designs includes one or more individual slides. The method further includes selecting, using the graphical user interface, desired dimensions of the painting, securing a transparent sheet onto a border of the display device, and displaying, on the display device, an individual slide for the selected design, whereas many of the individual slides represents painting slides, wherein each painting slide includes black shapes correlating to a section of the selected design and over which a user is instructed to paint on top of these black shapes on the transparent sheet. Individual slides which are non-painting slides represents review slides, wherein each review slide includes a darkened area around the painted shape in one or more previous painting slides, enabling a user to review a portion painted over one or more of the painting slides, and wherein the displaying step in repeated for each individual slide for the selected design. The method additionally includes applying paint onto the black shapes of the painting slides and adjusting colors of the painted areas can be performed while on the review slides.

It is an object of the present invention to provide for the system for producing painted pictures, wherein the display device may be a television, a computer monitor, a rear-projection screen, or any other suitable device.

It is an object of the present invention to provide for the system for producing painted pictures, wherein each of the plurality of paints is a predetermined color.

It is an object of the present invention to provide for the system for producing painted pictures, further including a set of instructions configured to guide a user to produce a painted picture.

It is an object of the present invention to provide for the system for producing painted pictures, further including one or more black opaque sheets of the same dimensions as the one or more transparent sheets.

It is an object of the present invention to provide for the system for producing painted pictures, further including a graphical user interface, coupled to the processor, configured to enable a user to input an input code, wherein the processor will not display any of the series of images on the display device without the input code being input.

It is an object of the present invention to provide for the system for producing painted pictures, wherein the input code is housed on a printed card.

It is an object of the present invention to provide for the method for producing painted pictures, further including inputting an input code using the graphical user interface, wherein the processor will not display the selected design without the input code being inputted.

It is an object of the present invention to provide for the method for producing painted pictures, further including determining, using the processor, a screen size of the display device, and calibrating a size of each of the displayed images, from the series of images, to coincide with the determined screen size of the display device.

It is an object of the present invention to provide for the method for producing painted pictures, wherein each design in the series of designs includes one or more individual image slides.

It is an object of the present invention to provide for the method for producing painted pictures, wherein the display device is a television, and further including installing an application onto the television and/or installing software (an APP) onto a mobile device which can cast to the television.

It is an object of the present invention to provide for the method for producing painted pictures, wherein the series of designs are separated into categories of designs.

It is an object of the present invention to provide for the method for producing painted pictures, wherein the categories of designs may be selected from portraits, reproductions of fine art, animals, logos, landmarks, and other pictorial genres.

It is an object of the present invention to provide for the method for producing painted pictures, wherein the series of designs includes a user customized image.

It is an object of the present invention to provide for the method for producing painted pictures, wherein the shape on each of the individual slides is black.

It is an object of the present invention to provide for the method for producing painted pictures, further including displaying, on the display device, instructions configured to inform the user when to apply paint to the transparent sheet and where to apply the paint on the transparent sheet.

It is an object of the present invention to provide for the method for producing painted pictures, further including selecting, using the graphical user interface, a selection of one or more pieces of music to play while painting the transparent sheet.

It is an object of the present invention to provide for the method for producing painted pictures, further including, after applying paint to all of the individual slides, displaying, on the display device, a black background on the display device.

It is an object of the present invention to provide for the method for producing painted pictures, further including, after applying paint to all of the individual slides, removing the transparent sheet from the display device, and securing a black opaque sheet to the transparent sheet on the side that faced the display device.

BRIEF DESCRIPTION OF THE DRAWINGS

FIGS. 1A-1C show a flowchart of a method of producing a painted image, according to an embodiment of the present invention.

DESCRIPTION OF THE PREFERRED EMBODIMENTS

Figure 1B:
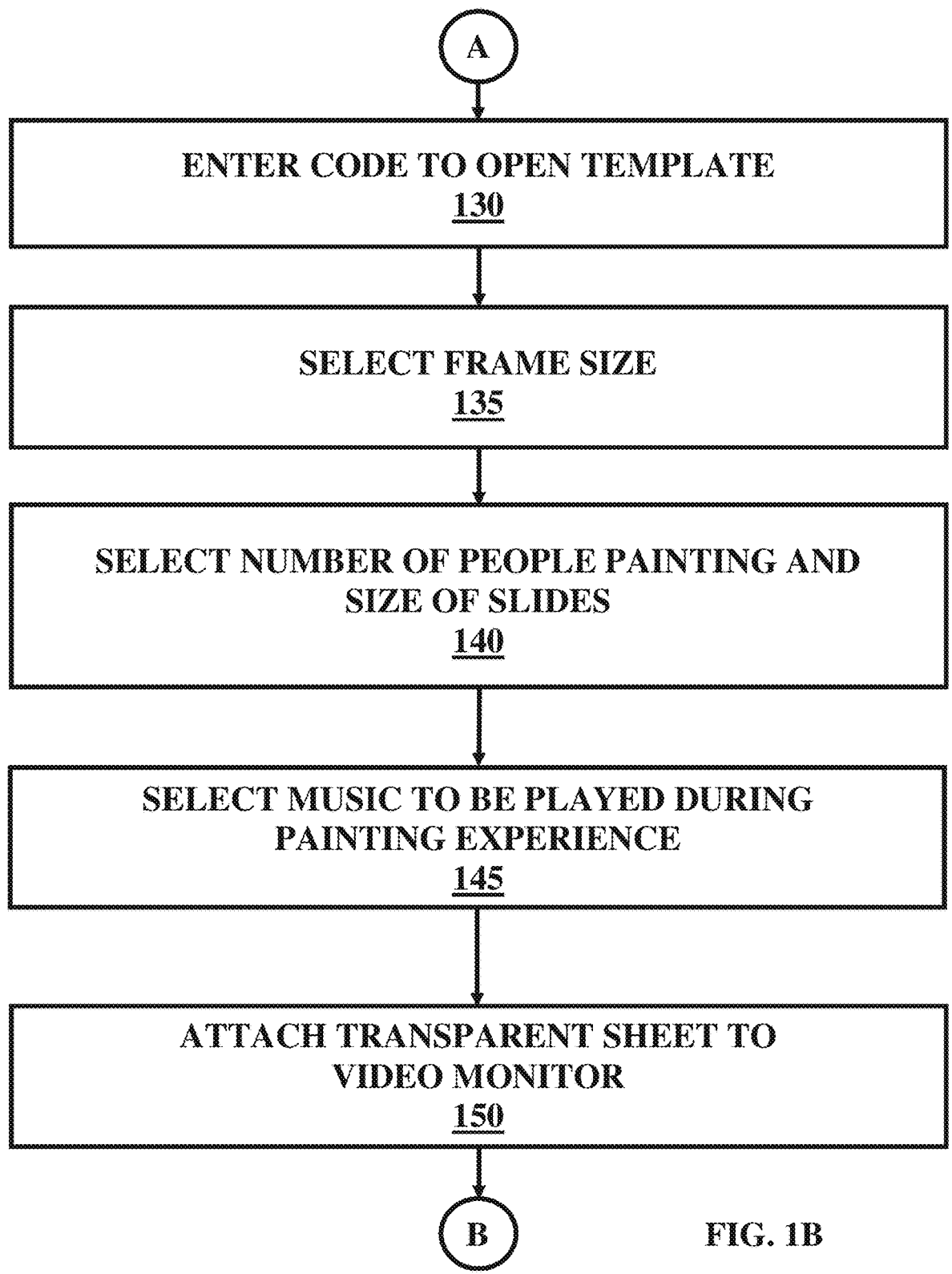

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1C:
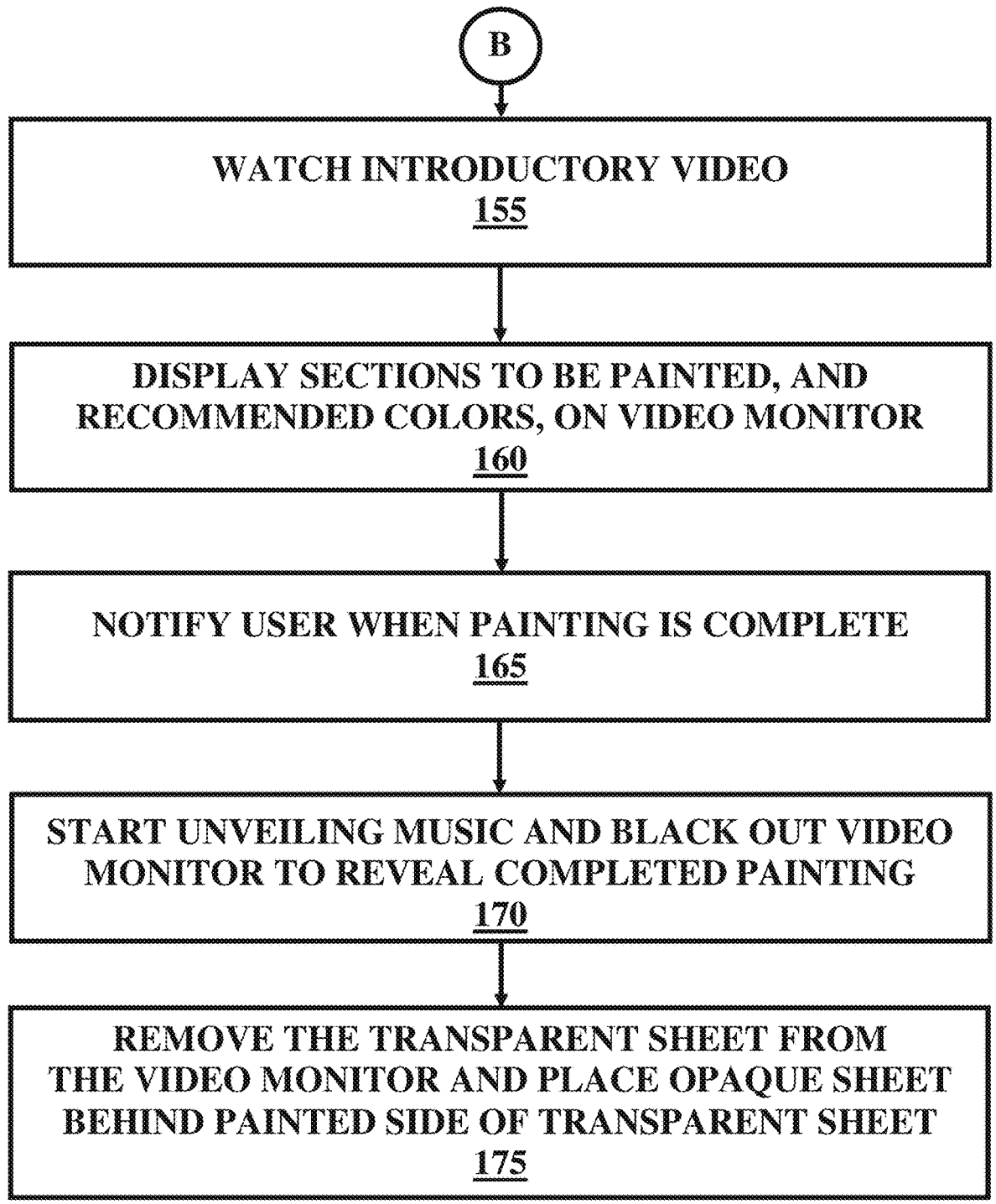

Referring now to FIGS. 1A-1C, a flowchart of a method 100 of producing a painted image is illustratively depicted, in accordance with an embodiment of the present invention.

According to an embodiment, one or more of the steps of the present method are performed using an application run on a computing device, such as, e.g., a desktop computer, a laptop computer, a television, a mobile device, a gaming console, or any other suitable computing device, while maintaining the spirit of the present invention.

At step 105, the application with which the user will paint is opened. According to an embodiment, the application may be included in a packaged painting kit which may include, e.g., paints, brushes, a transparent sheet, an opaque sheet, an adhesive, instructions, a card or other product listing an authorization code (such as in an email), and/or any other required materials.

According to an embodiment, the application is downloaded onto the video monitor, such as, e.g., a smart TV, a tablet computer, a mobile phone, etc., and/or the application is casted/sent to the video monitor from a mobile device on the same network as the video monitor.

At step 110, the application prompts the user to select a category of artwork that the user will paint from a list of categories. According to an embodiment, the list of categories includes, e.g., celebrity portraits, fine art reproductions, animal breeds, logos, customized images, and/or any other categories of imagery.

At step 115, the application prompts the user to select a specific painting to paint. This painting is selected from a list of paintings in the category selected by the user. According to an embodiment, non-customized paintings in the list of paintings have slides that are premade and ready to use with the application. According to an embodiment, the user may move, shift and/or zoom in/out, which may result in cropping the selected design prior to painting.

At step 120, if the user selects a customized image to paint, the user may upload an image that the user intends to paint. According to an embodiment, the application is opened prior to the uploading of the image. At step 125, the image is converted into a black-and-white template. According to an embodiment, the image is first converted into a black-and-white graphic. Then the edges of the graphic are smoothed. Then, any unwanted background images are removed from the graphic. According to an embodiment, all key areas (i.e.: Portrait: eyes, flesh, hair, clothes, background, etc.) need to be confirmed as closed areas by a user. If key areas of the graphics are not closed areas, the user will need to adjust the black-and-white graphic so that all key areas are closed. Optionally, colors are assigned to the various sections of the graphic. According to an embodiment, the image is then separated into a series of slides over which the user will paint. The painting slides represent the non-black colored portions of the painting, while the review slides aide the user(s) in determining if the painting colors have enough contrast during the painting process. If need be, painted areas can be adjusted while on the review slides.

According to an embodiment, a user must pre-pay before using the application. At step 130, the user enters a code to verify that the user has successfully paid for the ability to use the application. It is noted that other forms of verification may also be used, while maintaining the spirit of the present invention. According to an embodiment, if the user purchases the art kit with the supplies, the kit will include a card with a painting number to enter to show proof of purchase and enable the user to use the application to paint the picture. According to an embodiment, if the user already has painting supplies, the application enables the user to purchase additional designs directly through the application.

At step 135, the user selects the frame size for the painting. Depending on the size of the video monitor that the user will be using, certain frame sizes may only be available. Frame sizes may be, e.g., 16"×20", 18"×24", 24"×36". 24"×24", or any other suitable size. According to an embodiment, the user may customize the frame size. According to an embodiment, the application automatically determines the size of the screen on the video monitor to aid the user in determining the frame size. According to an embodiment, the various frame sizes may be displayed onto the video monitor screen to aid the user in determining the frame size.

At step 140, the user selects how many people will be painting and the size of the slides. An individual may paint alone or a group of people may paint together. According to an embodiment, if a group of people is selected, two or more of the individuals painting paint simultaneously. According to an embodiment, a group may only paint simultaneously if large slides are selected. According to an embodiment, if a group of people is selected, each person in the group takes turns painting. This is true for both large and small slides. According to an embodiment, if a group is selected, the group may split into two groups, wherein each group paints their own painting, using the same design, in a side-by-side experience on the same video monitor screen. This will enable each of the groups to paint their own versions of the same image. According to an embodiment, the user may select that two people are painting in a side-by-side experience in which each person paints their own painting, using the same design, on the same video monitor screen. The use of side-by-side painting may be limited by the size of the video monitor screen. This will create the same image, just with different finalized versions.

The user will paint on individual slides, while some slides are used to review the painting as it is being created, wherein each slide represents a portion of the finished painting. According to an embodiment, the user or users may have the option of painting on large area slides and/or small area slides. The large area slides break up the finished painting into larger pieces and fewer slides. The small area slides break up the finished painting into smaller pieces and more slides. This option may be limited, depending on the size of the video monitor screen.

At step 145, the user is prompted to select a music type to play during the painting session. According to an embodiment, the user may select that no music play during the painting session. According to an embodiment, the music is selected from the user's private music library. According to an embodiment, the music is played from a music service or provided from a music library.

At step 150, a transparent sheet is secured to the video monitor over the video monitor screen. The transparent sheet is the material onto which the one or more users will paint. The sheet can include plastic, glass, or any other suitable transparent material. According to an embodiment, to prevent possible damage to the video monitor screen, the transparent sheet is secured to the frame of the video monitor. According to an embodiment, the transparent sheet is secured to the video monitor using adhesive strips. It is noted, however, that other suitable methods of securing the transparent sheet to the video monitor may also be used, such as, e.g., glue, clips, etc.

According to an embodiment, prior to painting, the user or users are provided with an introductory video explaining the painting process. At step 155, the user or users watch this video.

At step 160, painting begins. The template for the painting is displayed onto the screen in individual slides. The slides are projected onto the video monitor screen via, e.g., a TV application, a monitor that is casted from a mobile device, or any other suitable method while maintaining the spirit of the present invention. According to an embodiment, for each of the painting slides, the portion to be painted is displayed in black, and all areas not to be painted are displayed as white. According to an embodiment, the suggested colors to be used for each slide are displayed on the video monitor screen or on the device which is running the app while the painting/review slides are casted/sent to the TV/monitor. After a slide has been successfully painted over, the next slide is shown, which might be a painting slide or a review slide, until the painting is complete. According to an embodiment, the review slides are slides with areas blacked out around and behind the area just painted to confirm to the user that the painted areas have enough color contrast against the black background of the review slide. If need be, painted areas can be reworked during the review slides. According to an embodiment, the user may manually switch from one slide to the next.

According to an embodiment, while using the large slides, a review slide is displayed after every painting slide. According to an embodiment, while using the small slides, a review slide may be displayed after every one or more painting slides.

After all slides have been successfully painted over by the user or users, at step 165 a notification is sent, notifying the user or users that painting is complete. According to an embodiment, the video monitor screen goes completely white after notifying the user that the painting is complete. According to another embodiment, the screen going completely white is the notification to the user that the painting is complete and functions as a form of pre-unveiling.

Since the painting slides represent the non-black colored portions of the painting, the painting, upon completion of painting over the individual slides, is missing the black portions.

At step 170, the video monitor screen goes black, filling in all of the unpainted portions of the painting with black, thus revealing the completed painting. The blackened areas provide structure to complete the painting. According to an embodiment, music plays as the screen blacks out. According to an embodiment, the music is in sync with the blacking out of the screen. According to an embodiment, the screen may change colors (such as yellow, orange, red, green, blue, black, etc.) several times, fade in and out, and may have video motion displayed in the background before going to black. At step 175, the painting is removed from the video monitor to dry. According to an embodiment, the opaque sheet (e.g., a black sheet), is secured to the unpainted side of the transparent sheet so that the opaque color fills in the portions of the transparent sheet not painted on the painted side. According to another embodiment, the user or users paint the unpainted sections with or without the opaque sheet. According to another embodiment, the user or users paint the unpainted reverse side of the transparent sheet with black or darker paint colors without the opaque sheet.

Referring now to FIGS. 2A-2E, the various steps from original image to painted picture are illustratively depicted, in accordance with embodiments of the present invention. According to an embodiment, the steps shown in FIGS.

2A-2E are to be performed by artistic designers and not by users using the application. According to an embodiment, if FIG. 2A is not a photo but instead an original digital drawing/illustration designed for this process, then no adjustments (FIGS. 2B-2D) are needed to be performed other than that all sections (ie: flesh, hair, clothes, etc) need to be confirmed "closed" (FIG. 2E).

Figure 2A:
FIGS. 2A-2E show the various steps from an original image (a photo or graphic) to a final graphic with closed colored sections (eyes, flesh, hair, etc), according to an embodiment of the present invention.
Figure 2B:
Figure 2C:

FIG. 2A shows an original image. This is the image desired to become a template for a painting. Using software/apps such as, e.g. Adobe Photoshop, Adobe Illustrator, Toon Camera, Imaengine, PencilSketch, etc. the image in FIG. 2A is converted into a black-and-white image (FIG. 2B) in which the contours of shadow areas foams the picture (ie: contour lines of shadows creates the features in a portrait) According to the embodiment shown in FIG. 2B, the image has imperfections and needs to be cleaned up (such as, e.g., removing small pixels) and edges smoothed either by hand or using filters such as adjusting thresholds (Photoshop) and/or using an IMAGE TRACE options in Illustrator. This process is performed ahead of time for all designs offered in the painting library/catalog through which the user can select. For uploaded images, photographs can be converted to black-and-white images via any appropriate method. According to an embodiment, the thresholds can be adjusted in hopes to better capture the essence of the subject the user wishes to paint. Several pictures may need to be adjusted before a suitable B&W design is created.

All element areas such as eyes, flesh, hair, clothes, background, for a portrait, need to be "closed areas" meaning there can be no open lines in the drawing. The black lines that make up the eyes must be closed off for easy selection inside the area of the eyes without selecting the flesh areas. This process is performed ahead of time for all designs offered in library/catalog. It will need to be confirmed that all areas all closed off from each other. The cleaned up image with the closed lines can be seen in FIG. 2D.

Figure 2D:
Figure 2E:
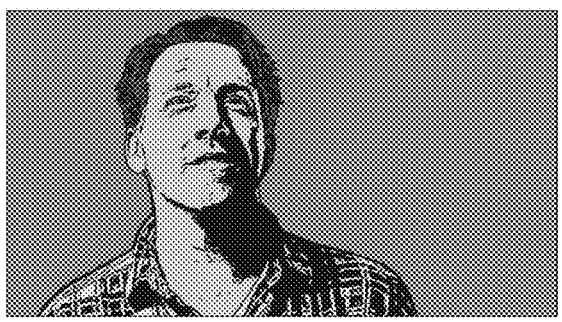

Any unwanted portions of the image, such as the background, are also removed. The cleaned up image of FIG. 2B with the background removed is shown in FIG. 2D. According to another embodiment, the image is drawn freehand without the need to convert a photograph.

Once the image outline is finalized, colors are assigned to each section of the image, such as, e.g., yellow for the eyes, red for the hair, green for the clothes, blue for the background, etc. According to an embodiment, these sections are separated into individual slides.

According to an embodiment, a user, or a plurality or users, paint over the individual painting slides, creating a fully painted image, shown in FIG. 2E.

Figure 3A:
FIGS. 3A-3O show screenshots of an application used during the painting process, according to an embodiment of the present invention.

Referring now to FIGS. 3A-3O, screenshots of an application used during the painting process are illustratively depicted, in accordance with embodiments of the present invention.

FIG. 3A shows a prompt for a user to select a category of painting. According to the embodiment shown in FIG. 3A, the categories are "Celebrity Portraits," "Fine Art Reproduction," "Animal Breeds," "Logos," and "Customized Images." It is noted, however, that other suitable categories of imagery may also be used.

Figure 3B:
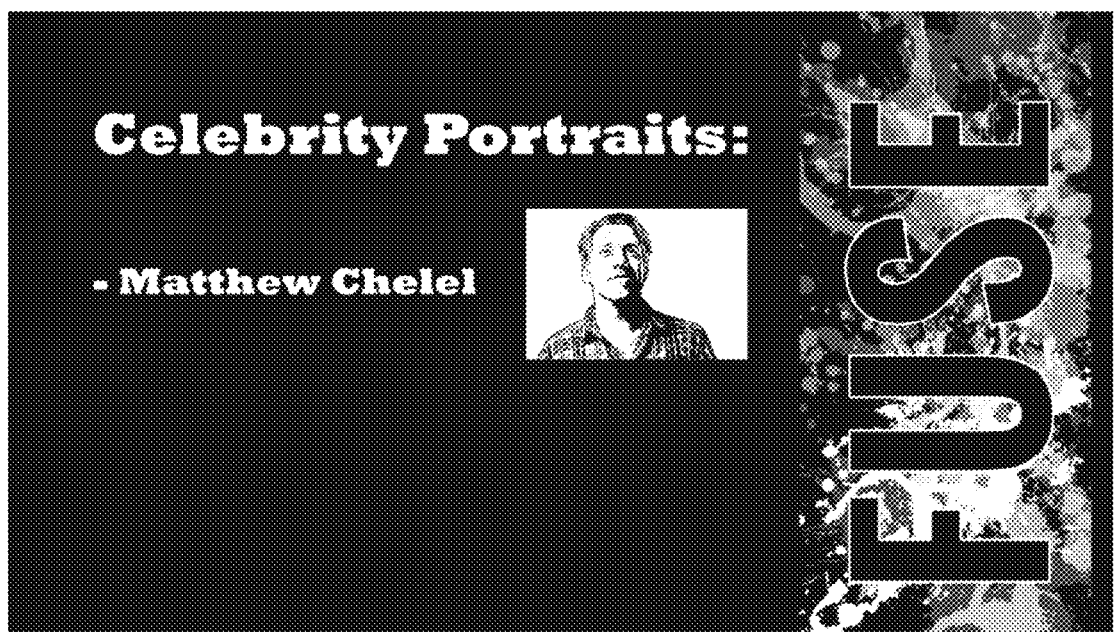
Figure 3C:

When a user selects a category, the application displays painting templates available for that category. According to an embodiment, the user selects "Celebrity Portraits." FIG. 3B shows a sample results page for such a selection. According to the embodiment shown in FIG. 3B, a result, "Matthew Chelel," appears. However, other painting templates may be listed under the "Celebrity Portraits" category.

Figure 3D:
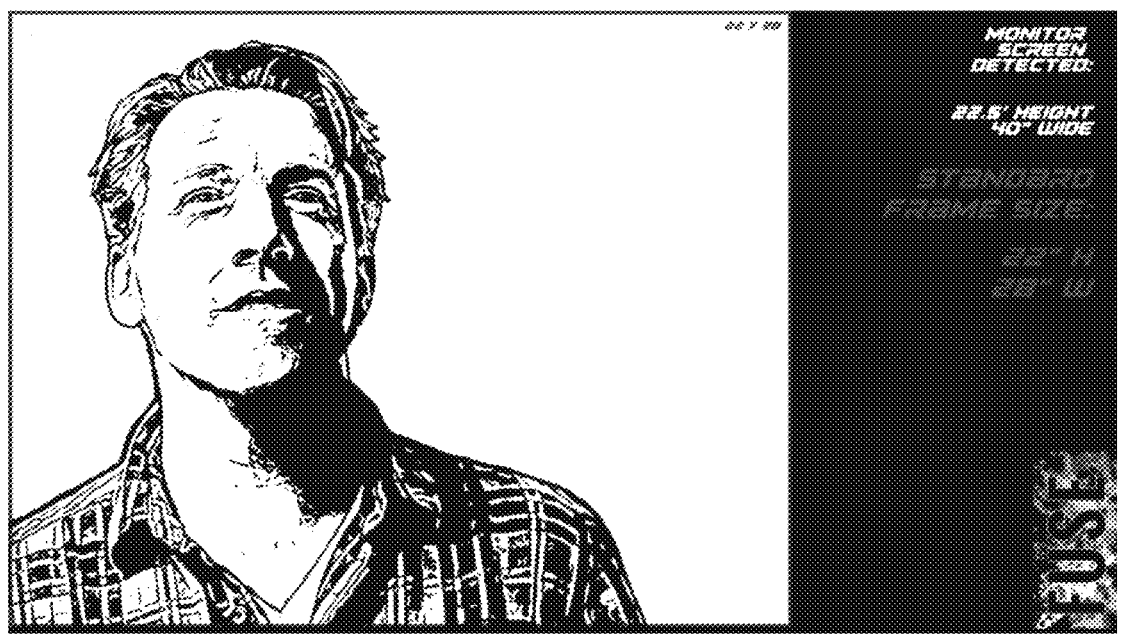

After the user selects a painting template, the application prompts the user to provide information to establish that the user is an approved user. According to the embodiment shown in FIG. 3D, the application prompts the user to provide proof of purchase and to "PLEASE ENTER CODE ON PAINTING CODE." According to an embodiment, the code is provided in a supplied kit on, e.g., a code card. If the user does not have a code card because they already have supplies from leftover kit, the user can purchase a painting code at this time. This According to an embodiment, a painting code is delivered digitally via email, text, and/or other digital means.

After the user has established that the user is an approved user, the user selects the frame size for the painting. According to the embodiment shown in FIG. 3D, the user is notified that the screen size of the video monitor has been detected ("MONITOR SCREEN DETECTED"), that it has 22.5" in height and 40" in width, and suggests a standard frame size of 22" in height and 22" in width. It is noted that other frame sizes may also be used, while maintaining the spirit of the present invention. According to an embodiment, during this time, the user has the ability to adjust the user's selected design to fit the "digital window." The design can be moved around and/or zoomed in/out to better fit the desired "digital window" size.

Figure 3E:

According to the embodiment shown in FIG. 3E, the user is prompted to "SELECT YOUR PAINTING EXPERIENCE"; that of an individual experience and a group experience. It is noted that, according to some embodiments of the present invention, other experiences may also be selected, such as, e.g., side-by-side experiences.

Figure 3F:
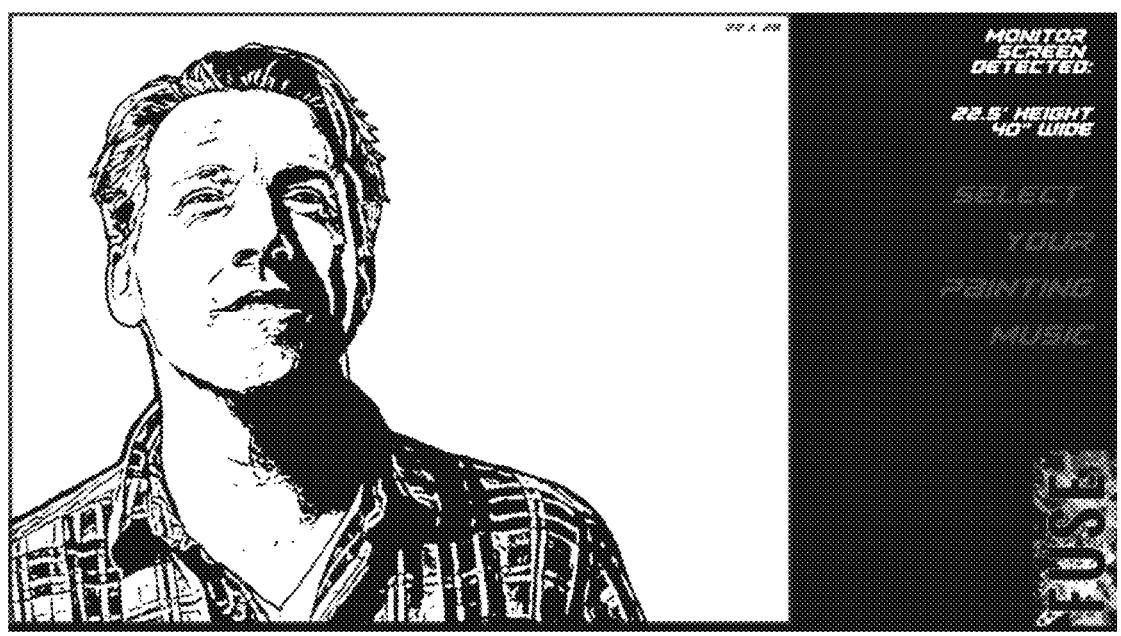

According to the embodiment shown in FIG. 3F, the user is prompted to "SELECT YOUR PAINTING MUSIC." According to embodiments, this music may be pre-programmed with the application, may be in the user's music library, is provided from a music service, or is played from some other suitable source.

Figure 3G:
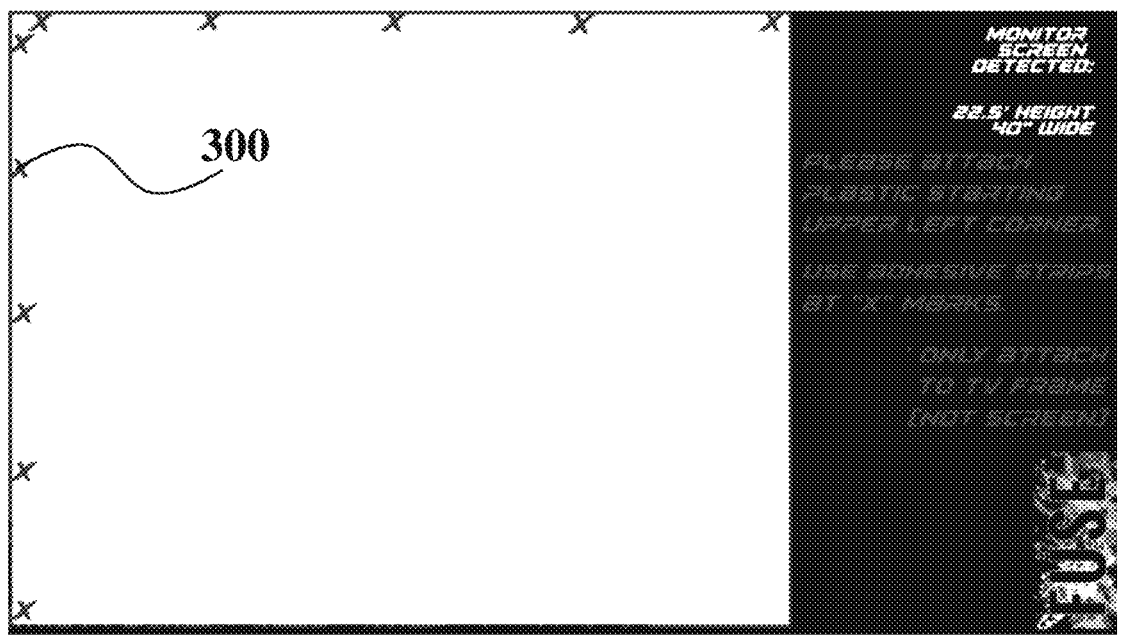

According to the embodiment shown in FIG. 3G, the user is prompted to attach the transparent sheet to the video monitor ("PLEASE ATTACH PLASTIC STARTING UPPER LEFT CORNER") and where to attach adhesives ("USE ADHESIVE STRIPS AT 'X' MARKS" 300). To protect the screen of the video monitor, the user is advised to "ONLY ATTACH TO TV FRAME (NOT SCREEN)."

Figure 3H:

According to the embodiment shown in FIG. 3H, a "WELCOME VIDEO" is presented to the user to explain the process by which the painting is to be painted. According to an embodiment, the video may be skipped by returning clients who are already familiar with the painting process.

Figure 3I:
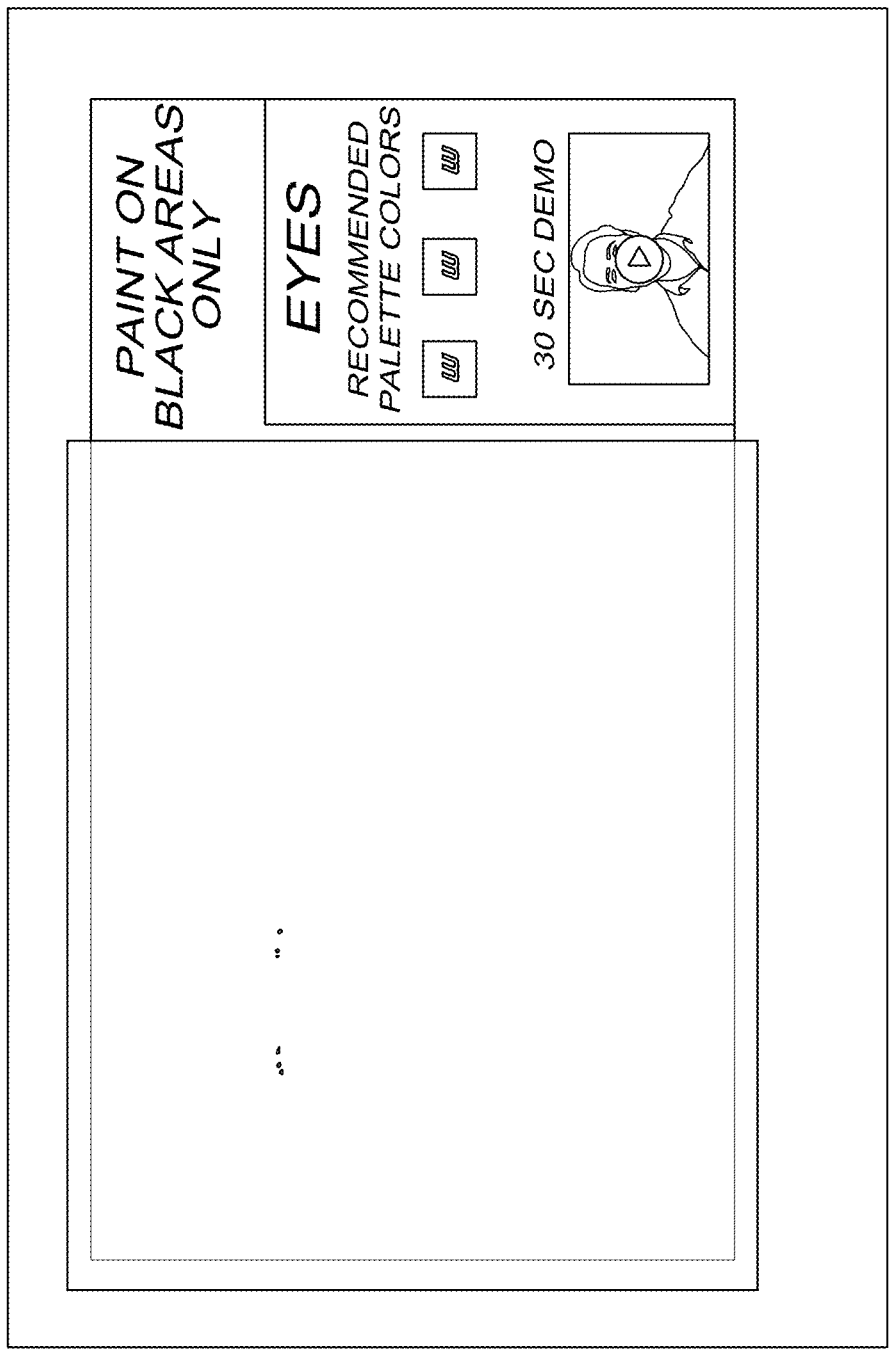

According to the embodiment shown in FIG. 3I, a slide showing a portion of the eyes of the painting template is shown, displayed on the video monitor through the transparent sheet, suggesting that the user use the color white to color the eyes by painting over the blackened areas.

Figure 3J:
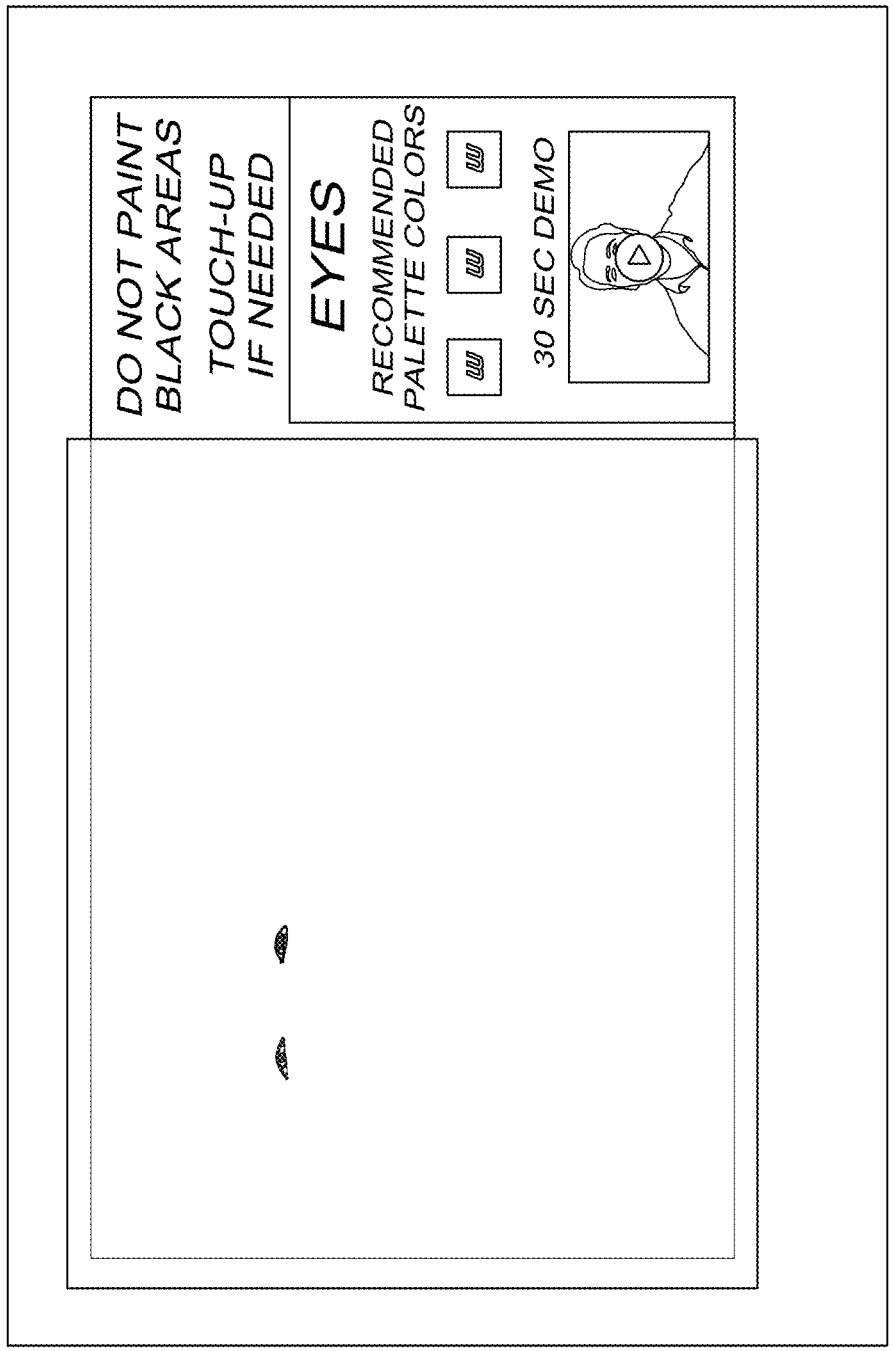

According to the embodiment shown in FIG. 3J, a review slide is shown, enabling a user to analyze the paint just applied over the section painting over in FIG. 3I. According to an embodiment, the review slides are slides with areas blacked out around and behind the area just painted to confirm to the user that their painting colors have enough contrast against black. While on review slides, if need be, user may adjust colors in painted areas to create more contrast in their painting. According to an embodiment, the slide informs the user that the slide is for review and to only paint over blackened portions if any touch-up is needed or desired. According to the embodiment shown in FIG. 3J, the slide reads "DO NOT PAINT BLACFK AREAS" and "TOUCH-UP IF NEEDED".

Figure 3K:
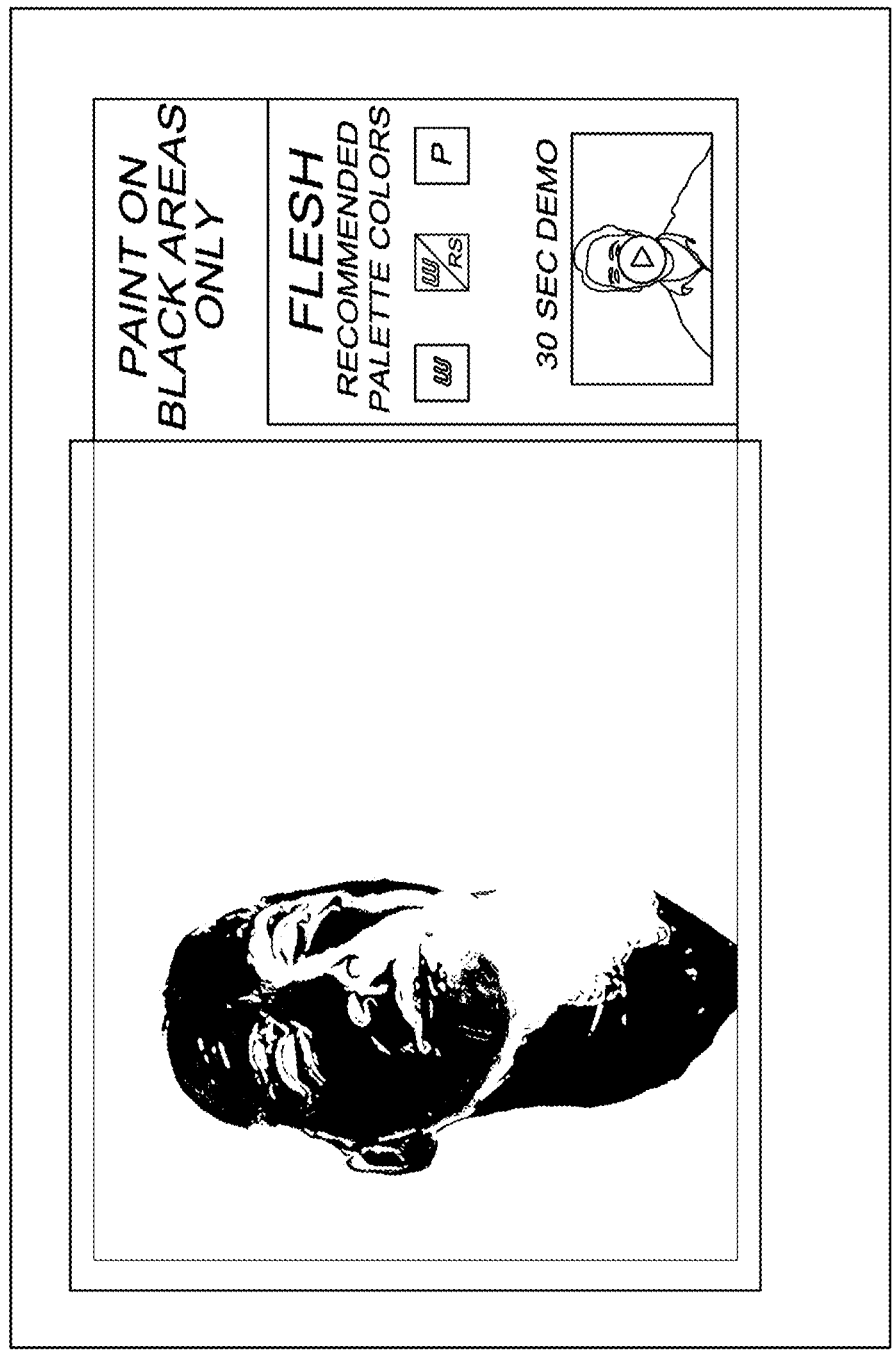
Figure 3L:
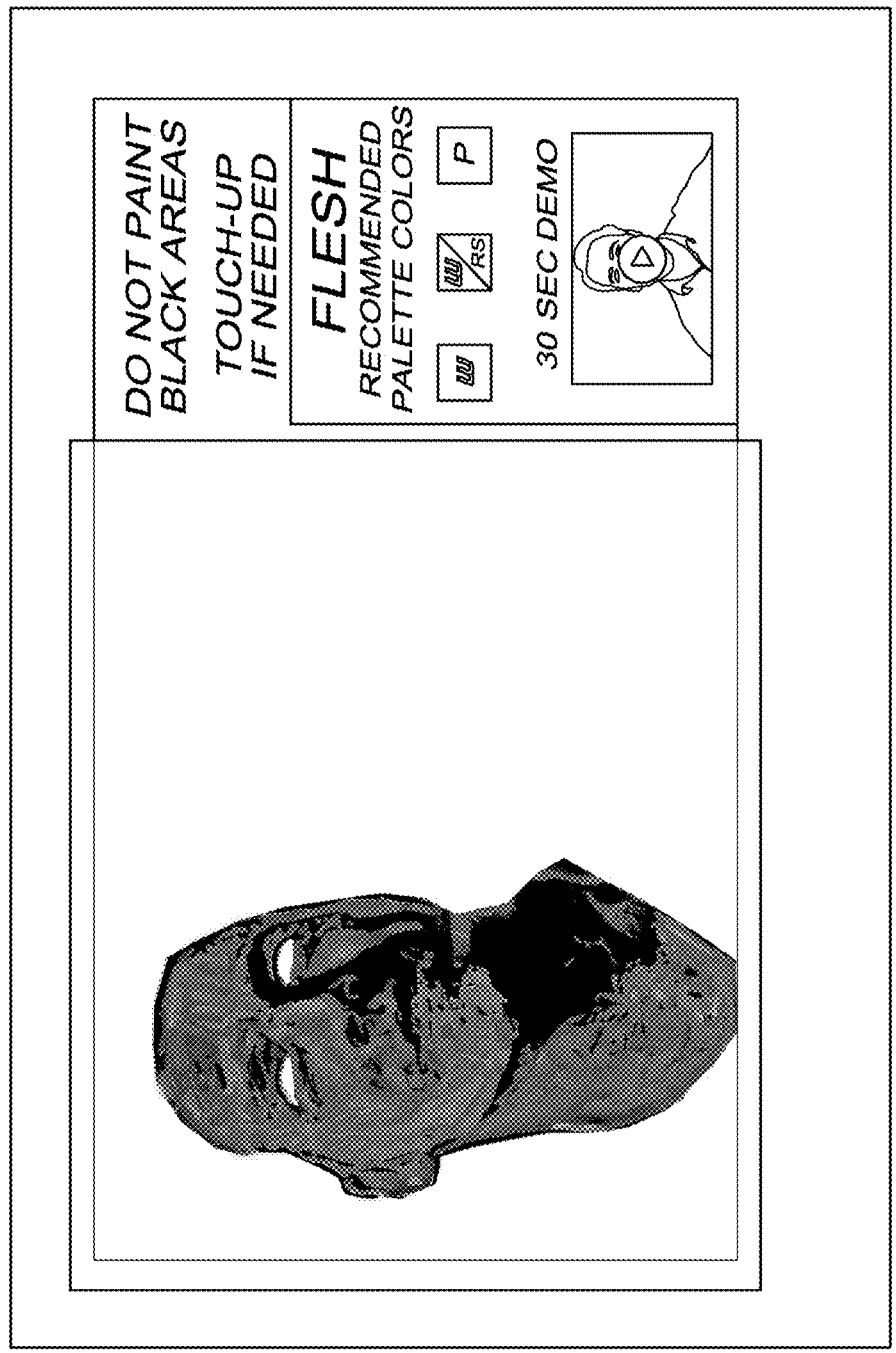

According to the embodiment shown in FIG. 3K, a slide showing a portion of the face of the painting template is shown, displayed on the video monitor through the transparent sheet, suggesting that the user use the suggested colors to paint the portion of the face by painting over the blackened areas. According to the embodiment shown in FIG. 3L, a review slide to review and touch-up the painting completed during the slide shown in FIG. 3K is shown.

Figure 3M:
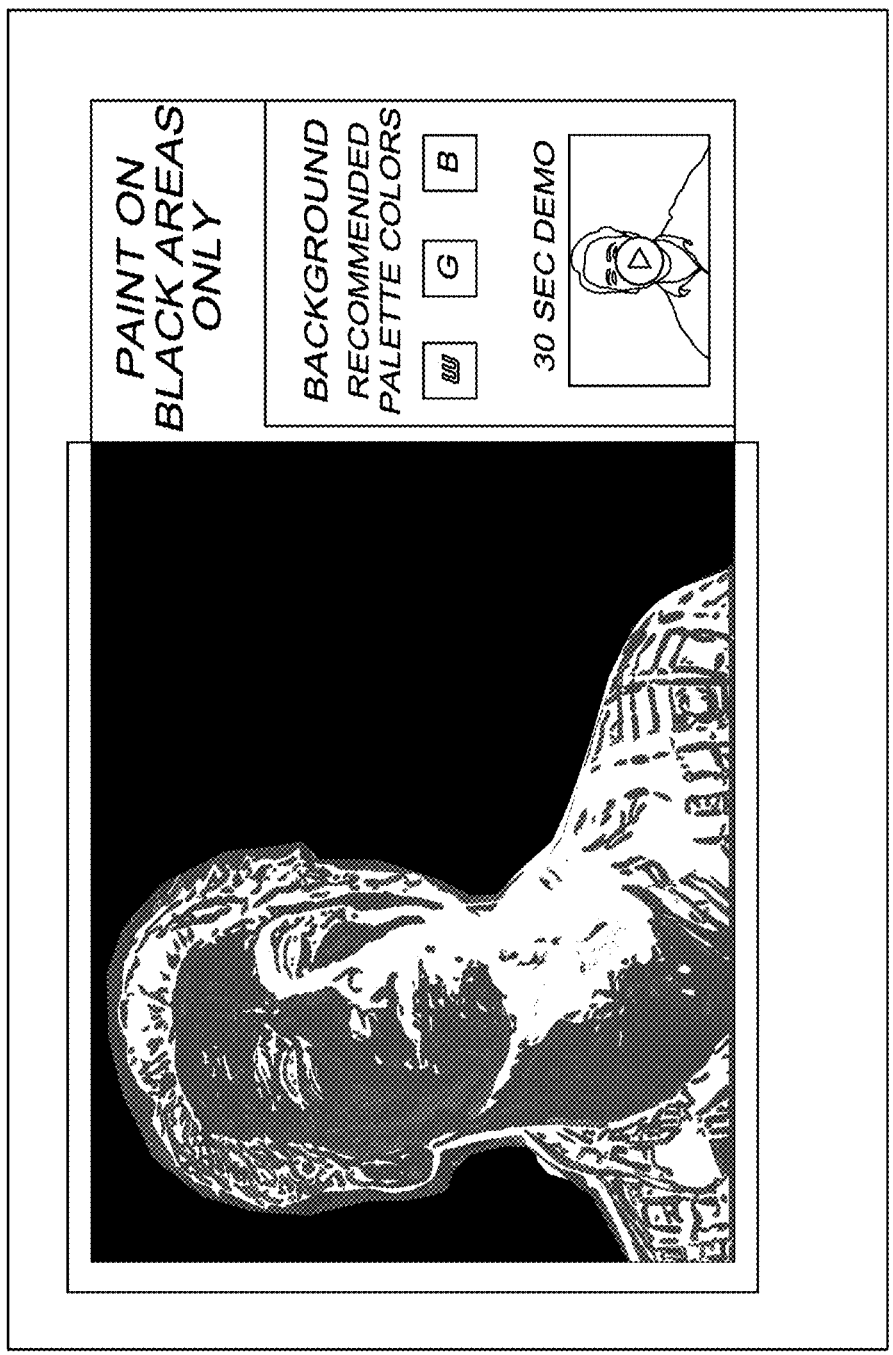

According to the embodiment shown in FIG. 3M, a slide showing a portion of the background of the painting template is shown, displayed on the video monitor through the transparent sheet, suggesting that the user use the suggested colors to paint the portion of the background by painting over the blackened areas.

Figure 3N:
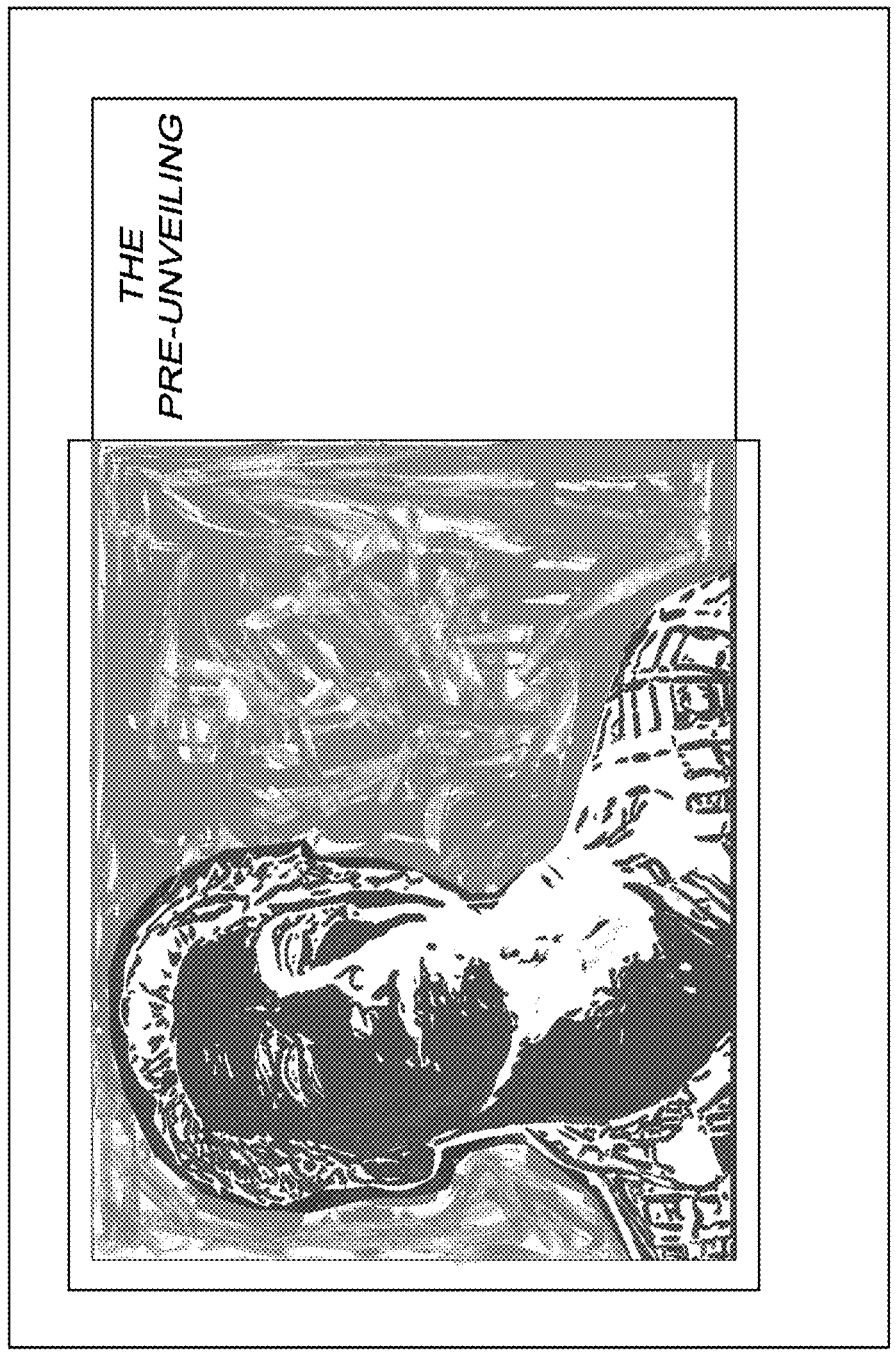
Figure 30:
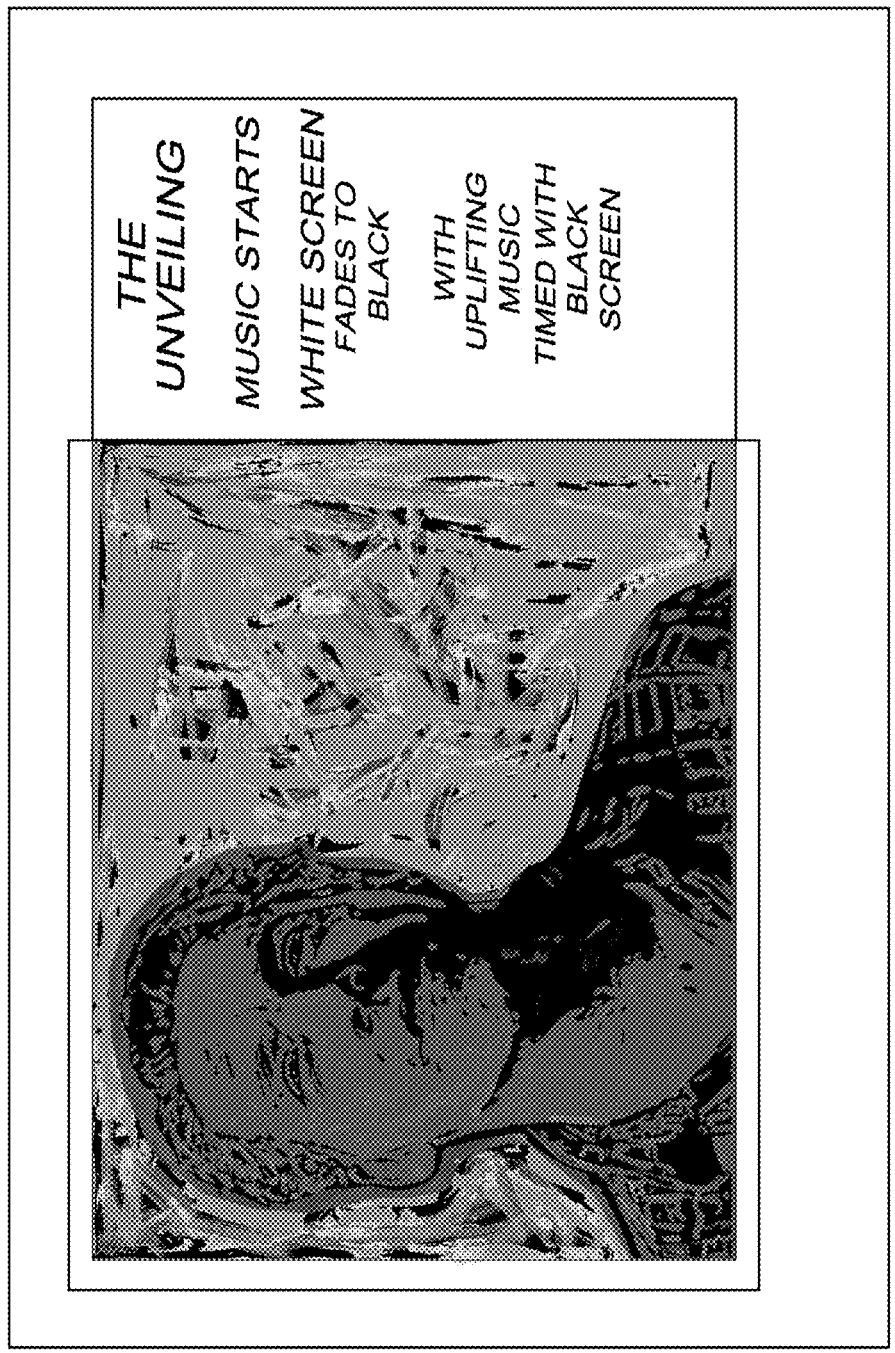

FIG. 3N shows a whitened screen to function as a pre-unveiling screen. FIG. 3O shows the blacked out screen to be displayed upon completion of painting over all of the previous slides and functions as an unveiling screen. According to an embodiment, the unveiling is accompanied by music such as, e.g., uplifting-sounding music.

Figure 4A:
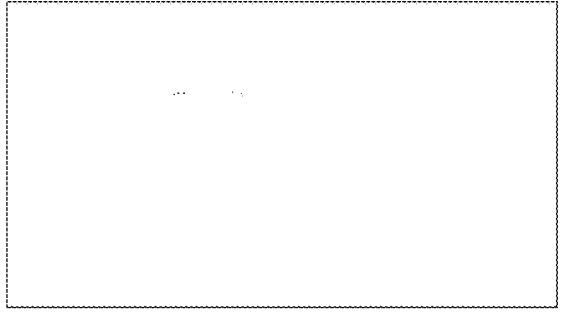
FIGS. 4A-4K show individual large area slides over which a user is to paint and review, according to an embodiment of the present invention.
Figure 4B:
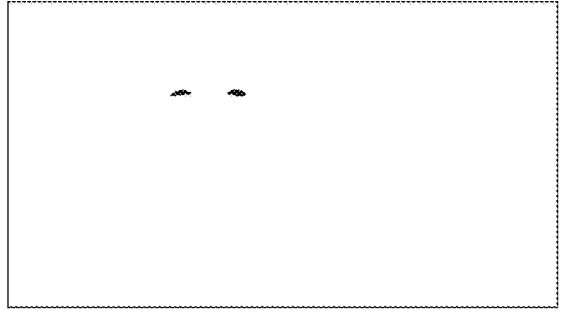
Figure 4C:
Figure 4D:
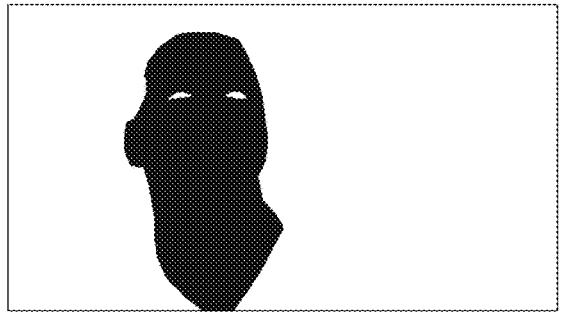
Figure 4E:
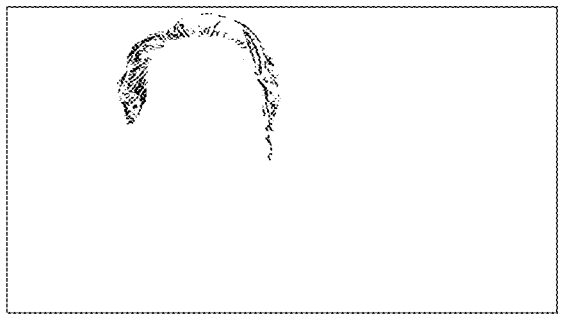
Figure 4F:
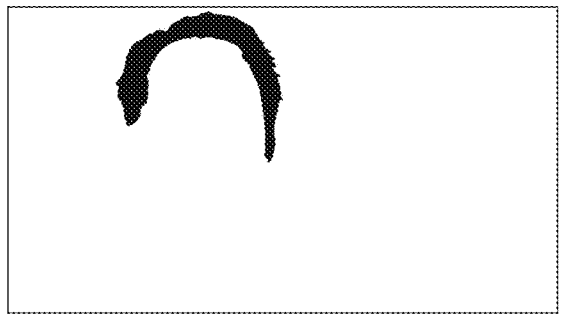
Figure 4G:
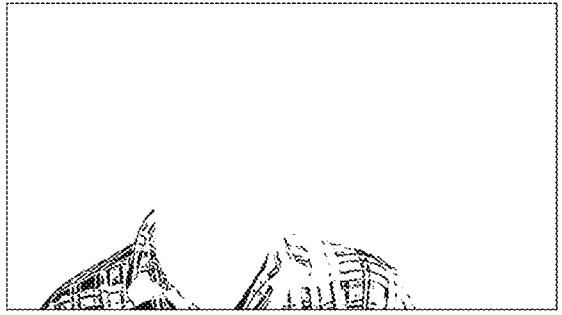
Figure 4H:
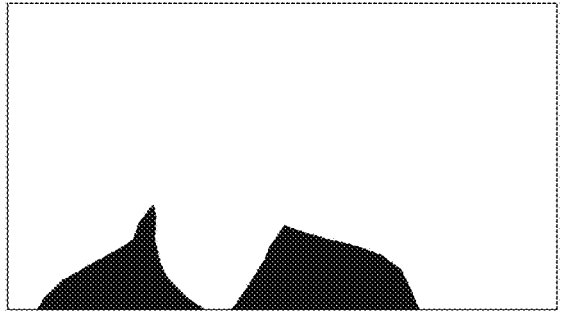
Figure 4I:
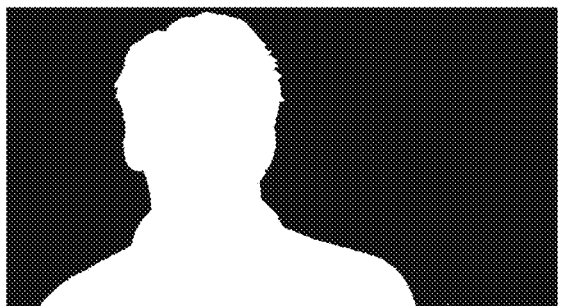
Figure 4J:
Figure 4K:
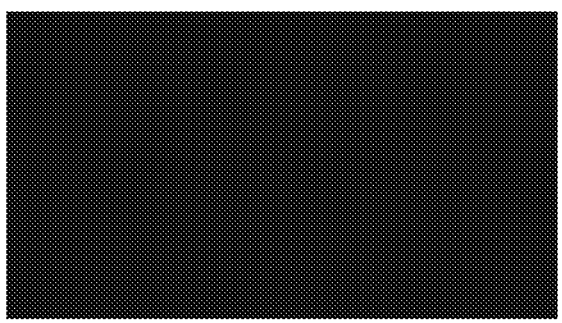

Referring now to FIGS. 4A-4K, individual large area painting slides, over which a user is to paint, and review slides are illustratively depicted, in accordance with embodiments of the present invention. Each of the large area slides shown in FIGS. 4A, 4C, 4E, 4G, and 4I represent an individual portion of the completed painted over which the user is to paint. FIGS. 4B, 4D, 4F, and 4H represent review slides. According to an embodiment, the review slides are slides with areas blacked out around and behind the area just painted to confirm to the user that their painting colors have enough contrast against black. While on review slides, if need be, user may adjust colors in painted areas to create more contrast in their painting. FIG. 4J shows a whitened screen to function as a pre-unveiling screen. FIG. 4K shows the blacked out screen to be displayed upon completion of painting over all of the previous large area slides and functions as an unveiling screen.

Figure 5A:
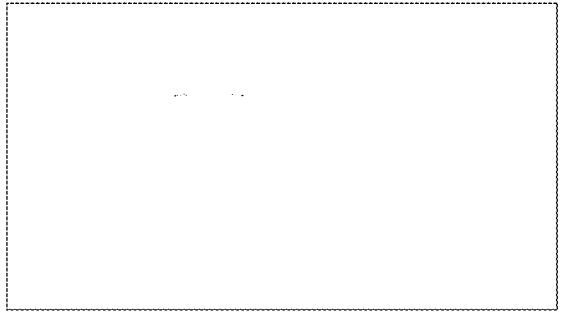
FIGS. 5A-5P show individual small area slides over which a user is to paint and review, according to an embodiment of the present invention.
Figure 5B:
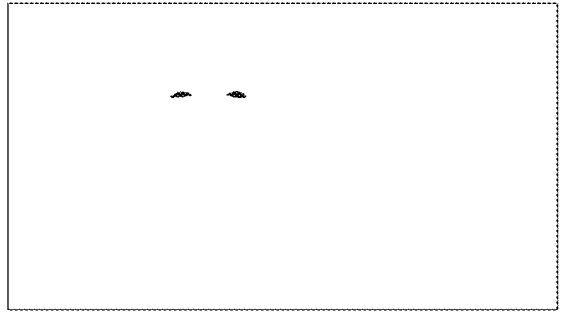
Figure 5C:
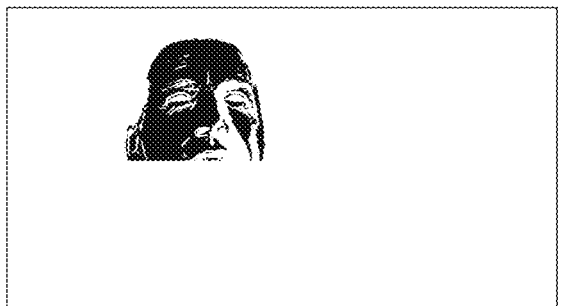
Figure 5D:
Figure 5E:
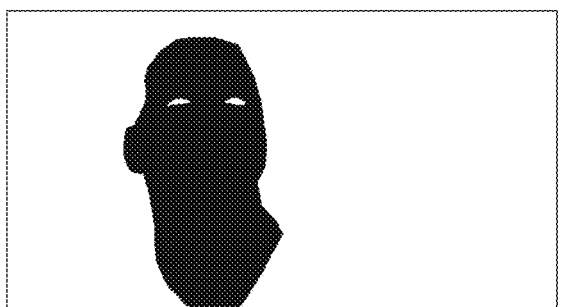
Figure 5F:
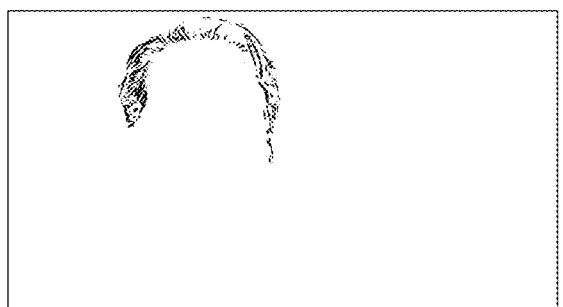
Figure 5G:
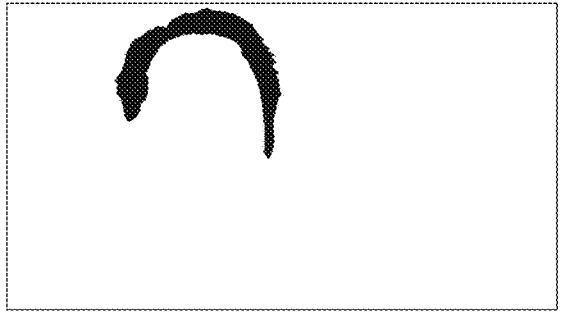
Figure 5H:
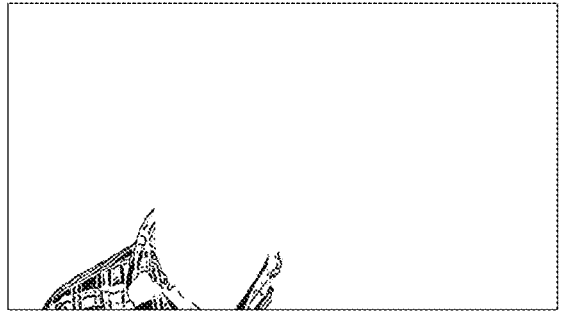
Figure 5I:
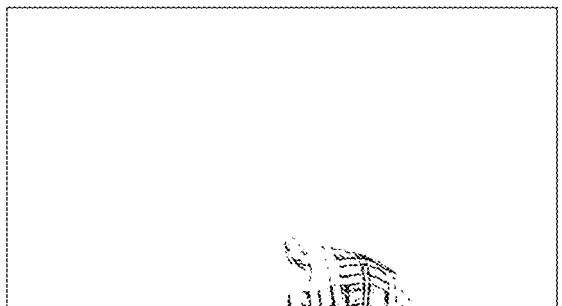
Figure 5J:
Figure 5K:
Figure 5L:
Figure 5M:
Figure 5N:
Figure 5O:

Referring now to FIGS. 5A-5O, individual small area painting slides, over which a user is to paint, and review slides are illustratively depicted, in accordance with embodiments of the present invention.

Figure 5P:
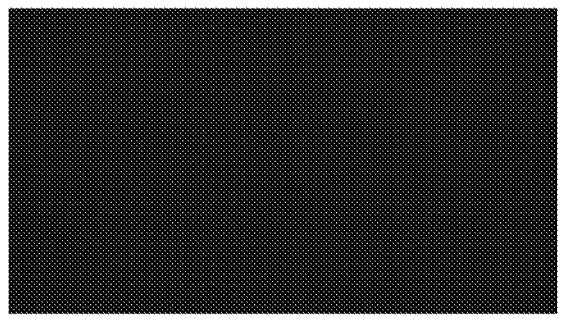

Each of the small area slides shown in FIGS. 5A, 5C, 5D, 5F, 5H, 5I, 5K, 5L, 5M, and 5N represent an individual portion of the completed painted over which the user is to paint. FIGS. 5B, 5E, 5G, and 5J represent review slides. According to an embodiment, the review slides are slides with areas blacked out around and behind the area just painted to confirm to the user that the painting has enough contrast against black. According to an embodiment, the user may choose to adjust the painted areas only while on a review slide. FIG. 5O shows a whitened screen to function as a pre-unveiling screen. FIG. 5P shows the blacked out screen to be displayed upon completion of painting over all of the previous large area slides.

Referring now to FIGS. 6A-6D, screenshots of an application used during the painting process are illustratively depicted, according to an embodiment of the present invention.

Figure 6A:
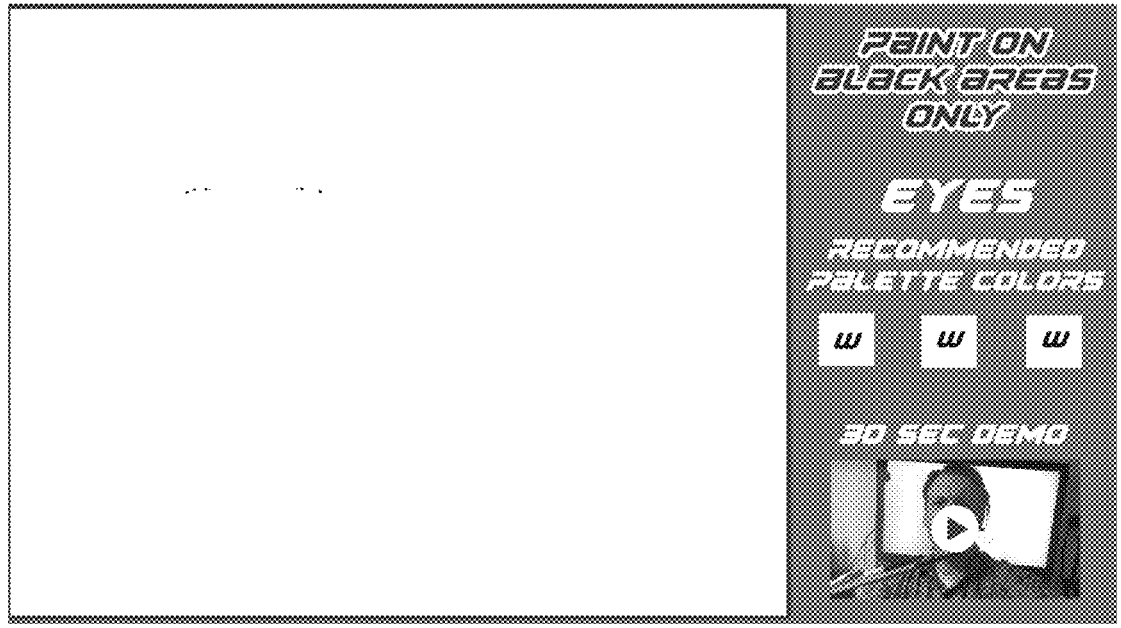
FIGS. 6A-6D show screenshots of an application used during the painting process, according to an embodiment of the present invention.

A painting slide, over which the user is to paint, is shown in FIG. 6A. According to the screenshot shown in FIG. 6A, an area is blackened indicating a portion of the eyes. The user is instructed to paint over the blackened portions. According to an embodiment, all areas not to be painted are displayed as white. According to an embodiment, the suggested colors to be used for each slide are displayed on the video monitor screen. In FIG. 6A, the suggested color is white. It is noted that other colors may also be suggested, while maintaining the spirit of the present invention.

Figure 6B:
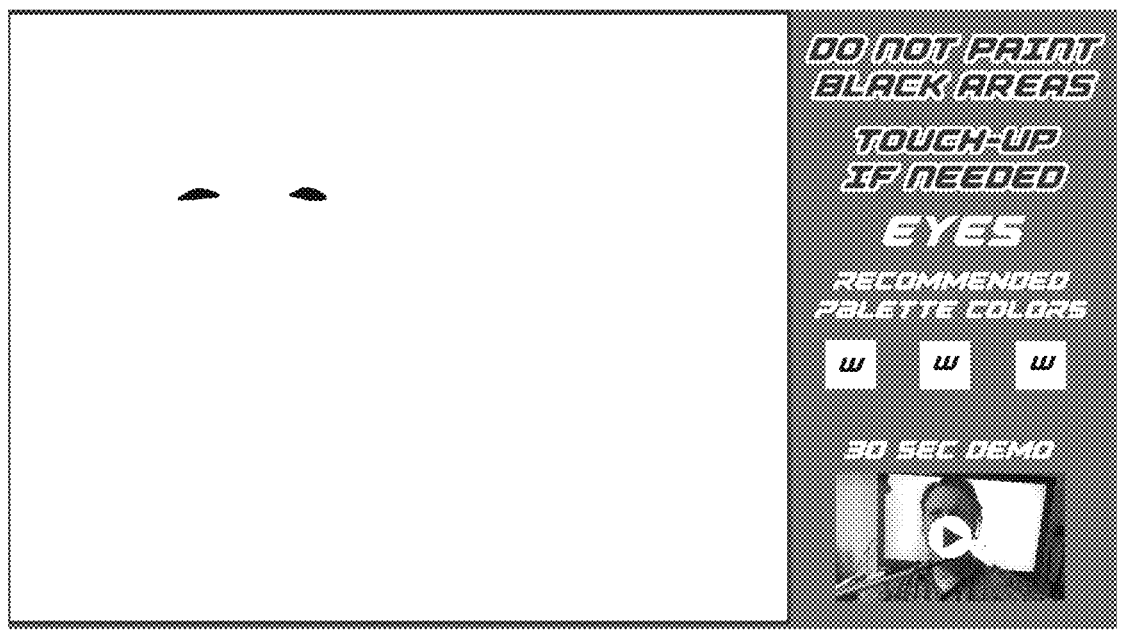

According to the screenshot shown in FIG. 6B, a review slide is shown. According to an embodiment, this screen displays after the user has painted over the painting slide (FIG. 6A). The application communicates to the user that the user is not to use the area as a painting slide, but for touch-ups to the already painted area. The application may also display suggested colors to be used for the touch-ups.

According to an embodiment, the review slides are slides with areas blacked out around and behind the area just painted to confirm to the user that the painted areas have enough color contrast against the black background of the review slide. If need be, painted areas can be reworked during the review slides. According to an embodiment, the user may manually switch from one slide to the next.

According to an embodiment, a video demonstration may also be displayed to help the user along the process.

Figure 6C:
Figure 6D:
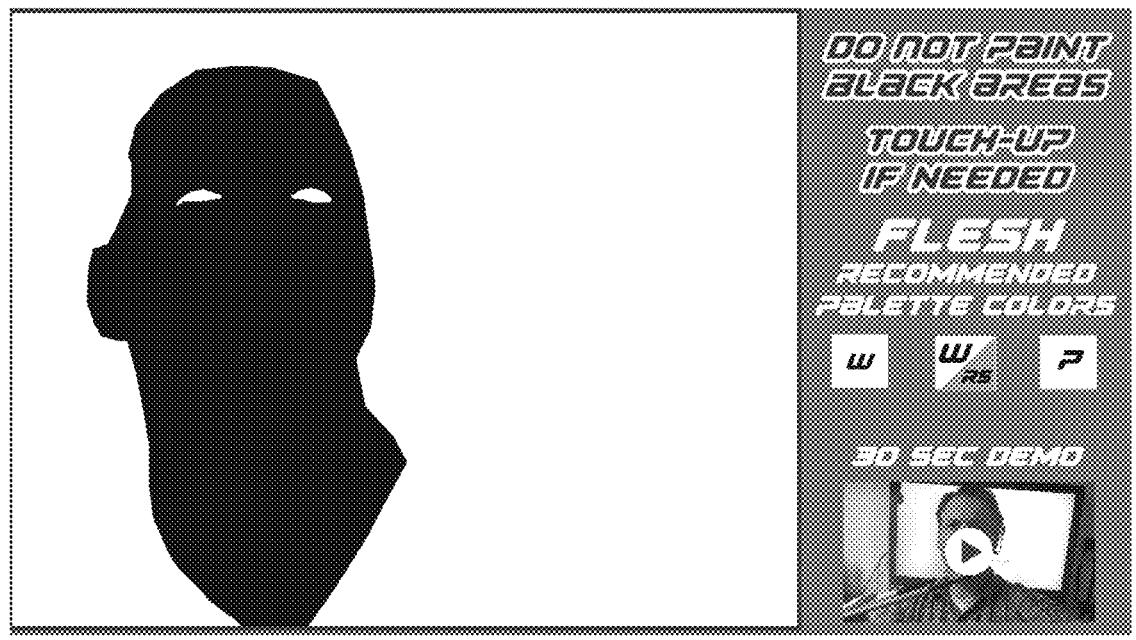

FIGS. 6C and 6D show a painting slide (FIG. 6C) and a review slide (FIG. 6D) for a portion of a head and serve the same basic functionality as FIGS. 6A and 6B.

According to an embodiment, the slides communicate to the user what portion of the painting an being worked on. For example, FIGS. 6A and 6B communicate to the user that the portion of the painting being worked on is the "EYES," while FIGS. 6C and 6D communicate to the user that the portion of the painting being worked on is the "FLESH."

Figure 7:
FIG. 7 shows a fully painted picture secured to a video monitor, according to an embodiment of the present invention.

Referring now to FIG. 7, a fully painted picture secured to a video monitor is illustratively depicted, in accordance with an embodiment of the present invention. As shown in FIG. 7, the transparent sheet secured to the video monitor and the screen behind the painted portions in blacked out, the black screen filling in any portions of the painted area not having any paint on them. The black area fills in the negative space so that the painting has structure and form, creating a painting with a completed appearance.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for producing painted pictures, comprising:
   receiving, from a user on a graphical user interface coupled to a display device, a selection of a design for a painting from a series of designs, wherein each design in the series of designs includes one or more individual slides;
   receiving, from the user on using the graphical user interface, desired dimensions of the painting;
   receiving, from the user on the graphical user interface, a selection of at least two painters to create the painting;
   securing a transparent sheet onto a border of the display device;
   displaying, on the display device, an individual slide of the one or more individual slides for the design, wherein a first group of the one or more individual slides represents painting slides, wherein each of the painting slides include a shape correlating to a section of the design and over which the user is instructed to paint onto the transparent sheet, wherein a second group of the one or more individual slides represents review slides, wherein each of the review slides includes a darkened area around the shape in one or more previous painting slides, enabling the user to review a portion painted over one or more of the painting slides, and wherein the displaying step is repeated for each of the one or more individual slides for the selected design; and applying, by each painter of the at least two painters, a paint onto the shape for each of the one or more individual slides such that the at least two painters, in real-time, paint the painting using the selected design on the display device.

2. The method as recited in claim 1, further comprising:

inputting an input code using the graphical user interface, wherein a processor displays the selected design upon the input code being inputted.

3. The method as recited in claim 1, further comprising:

determining, using a processor, a screen size of the display device; and calibrating a size of the selected design, from the series of designs, to coincide with the determined screen size of the display device.

4. The method as recited in claim 1, wherein each design in the series of designs includes one or more individual image slides.

5. The method as recited in claim 4, further comprising the step of:

installing an application onto the display device, wherein the application is configured to perform one or more of the steps of claim 1, and wherein the display device is a television.

6. The method as recited in claim 1, wherein the series of designs are separated into categories of designs.

7. The method as recited in claim 6, wherein the categories of designs are selected from the group consisting of: portraits; reproductions of fine art; animals; logos; and landmarks.

8. The method as recited in claim 1, wherein the series of designs includes a user customized image.

9. The method as recited in claim 1, wherein the shape correlating to the section of the design to be painted has a black color.

10. The method as recited in claim 1, further comprising:

displaying, on the display device, instructions configured to inform each painter of the at least two painters when to apply the paint to the transparent sheet and where to apply the paint on the transparent sheet.

11. The method as recited in claim 1, further comprising:

selecting, using the graphical user interface, a selection of one or more pieces of music to play.

12. The method as recited in claim 1, further comprising:

after applying the paint to each of the one or more individual slides, displaying, on the display device, a black background on the display device.

13. The method as recited in claim 1, further comprising:

after applying the paint to each of the one or more individual slides, removing the transparent sheet from the display device; and securing a black opaque sheet to the transparent sheet on the side that faced the display device.

* * * * *